US006241432B1

(12) United States Patent
Sasanecki (10) Patent No.: US 6,241,432 B1
(45) Date of Patent: Jun. 5, 2001

(54) MACHINE TOOL ACCESSORY HIGH PRESSURE FLUID DISTRIBUTION SYSTEM

(75) Inventor: L. James Sasanecki, West Suffield, CT (US)

(73) Assignee: Brookdale Associates, Agawam, MA (US)

( * ) Notice: Subject to any disclaimer, the term of this patent is extended or adjusted under 35 U.S.C. 154(b) by 0 days.

(21) Appl. No.: 09/422,676

(22) Filed: Oct. 21, 1999

Related U.S. Application Data
(60) Provisional application No. 60/105,494, filed on Oct. 23, 1998.

(51) Int. Cl.[7] .................................................. B23B 51/06
(52) U.S. Cl. ......................... 408/56; 137/884; 409/136; 417/426
(58) Field of Search .................... 137/884; 408/56, 408/61; 409/135, 136; 82/900; 417/287, 426, 427

(56) References Cited

U.S. PATENT DOCUMENTS

| 5,595,462 | * | 1/1997 | Hensley | 409/132 |
| 5,951,216 | * | 9/1999 | Antoun | 408/56 |

OTHER PUBLICATIONS

Cool Jet Systems, High Pressure Coolant Systems Catalog, pp1–10.
Cool Jet Systems, Cool Jet Application Performance Data Sheets.
Cool Jet Systems, Pumps and Controllers, Catalog, pp. 1–8, Nov. 22, 1993.
Chip Blaster, Understanding High Pressure Coolant Brochure, pp. 1–29, May 1, 1999.
Chip Blaster, Internate Web Page Publications CV26–3000, pp. 1, Aug. 12, 1999.
Chip Blaster, Internate Web Page Publications CV16–5000, pp. 1, Aug. 12, 1999.
Chip Blaster, Internate Web Page Publications CV36–1000, pp. 1, Aug. 12, 1999.

* cited by examiner

*Primary Examiner*—John Fox
(74) *Attorney, Agent, or Firm*—Perman & Green, LLP (57) ABSTRACT

A machine tool accessory fluid distribution apparatus comprising a booster pump, a fluid distribution system, and a controller. The booster pump is adapted for discharging, from a discharge end of the pump, fluid at a different pressure than a fluid pressure available in a machine tool. The fluid distribution system is connected to the discharge end of the booster pump, the fluid distribution system distributes fluid from the pump to workstations of the machine tool. The controller is controllably connected to the fluid distribution system for controlling fluid distribution to the workstations of the machine tool. The controller controls fluid delivered by the fluid distribution system to at least one of the workstations independently from fluid delivered by the distribution system to another one of the work stations of the machine tool.

26 Claims, 8 Drawing Sheets

MACHINE TOOL ACCESSORY HIGH PRESSURE FLUID DISTRIBUTION SYSTEM

CROSS-REFERENCE TO RELATED APPLICATION

This application claims the benefit of U.S. Provisional Application No. 60/105,494 filed Oct. 23, 1998, incorporated by reference herein in its entirety.

BACKGROUND OF THE INVENTION

1. Field of the Invention

The present invention relates to coolant systems for machine tools and, more particularly, to an accessory, high pressure cooling fluid delivery system for machine tools.

2. Prior Art

In general, machine tools are provided with integral cooling or lubricating systems which supply cooling or cutting fluid to the work stations of the machine tools. The cutting fluid generally reduces friction, draws heat away from the cutting tool and work piece and flushes the work site of debris. This generally improves control and accuracy of the machining process, increases production and reduces tool wear. However, the integral cooling systems of machine tools generally provide low pressure cutting fluid to the cutting area. The low pressure cutting fluid is inadequate for some operations of the machine tools to generate the desired cooling rates and flush away chips. Thus, for some operations a supplemental cooling fluid delivery system to provide high pressure cooling fluid to the cutting area of the machine tools is desirable. The supplemental cooling fluid delivery systems of the prior art generally provide a single coolant line directing high pressure cooling fluid to one work station. In the case more than one station was to be supplied by the prior art delivery systems, the cooling fluid from the single delivery line may have been split amongst several discharge nozzles resulting in lower pressures and/or reduced fluid flow at the nozzles in comparison to the pressure and flow in the single delivery line. The high pressure cooling fluid delivery system of the present invention overcomes the deficiencies of the prior art as will be described in further detail below.

SUMMARY OF THE INVENTION

In accordance with a first embodiment of the present invention, a machine tool accessory fluid distribution apparatus is provided. The fluid distribution apparatus comprises a booster pump, a fluid distribution system, and a controller. The booster pump is adapted for discharging, from a discharge end of the pump, fluid at a different pressure than a fluid pressure available in a machine tool. The fluid distribution system is connected to the discharge end of the booster pump for distributing fluid from the pump to workstations of the machine tool. The controller is controllably connected to the fluid distribution system for controlling fluid distribution to the workstations of the machine tool. The controller controls fluid delivered by the fluid distribution system to at least one of the workstations independently from fluid delivered by the distribution system to another one of the workstations of the machine tool.

In accordance with a second embodiment of the present invention, a machine tool accessory fluid distribution apparatus is provided. The fluid distribution apparatus comprises a frame, a booster pump, a fluid distribution system, and a controller. The booster pump is mounted to the frame. The booster pump is adapted for providing, from a discharge end of the pump, fluid at a higher pressure than a fluid pressure available in a machine tool. The fluid distribution system is connected to the discharge end of the booster pump for distributing fluid from the pump to workstations on the machine tool. The fluid distribution system comprises a manifold section with a multi-port output mounted to the frame, and a tubing section connecting the multi-port output to the workstations. The controller is mounted to the frame. The controller is controllably connected to the fluid distribution system for controlling fluid distribution to the workstations of the machine tool. The controller controls fluid delivered through the multi-port output of the fluid distribution system to at least one of the workstations independently from fluid delivered through the multi-port output to another one of the workstations of the machine tool.

In accordance with a method of the present invention, a method for delivering high pressure fluid to workstations of a machine tool is provided, the method comprises the steps of providing an accessory fluid distribution apparatus, and connecting the fluid distribution apparatus to the machine tool. The accessory fluid distribution apparatus comprises a booster pump, a fluid distribution system, and a controller. The booster pump boosts fluid pressure higher than fluid pressure available in the machine tool. The fluid distribution system is connected to the booster pump. The controller is used for controlling the fluid distribution apparatus. The fluid distribution system is connected to the machine tool for delivering high pressure fluid from the booster pump to the workstations of the machine tools, the controller is connected to a processor of the machine tool. The controller is adapted for using command signals transmitted from the processor for controlling the fluid distribution apparatus to deliver high pressure fluid to the at least one of the workstations independent from fluid delivered by the apparatus to another one of the workstations.

In accordance with a third embodiment of the present invention, a machine tool fluid distribution apparatus is provided. The fluid distribution apparatus comprises a booster pump, a fluid distribution system, and a controller. The booster pump delivers from an output end of the booster pump a predetermined fluid output volume at a predetermined pressure. The fluid distribution system is connected to the discharge end of the booster pump, the fluid distribution system distributes fluid from the pump to workstations of a machine tool. The controller is controllably connected to the fluid distribution system for controlling fluid distribution to workstations of the machine tool. The controller is adapted for using machine tool command signals for controlling the distribution system for sequentially directing the fluid output volume of the pump to a first one of the workstations and then to a second one of the workstations of the machine tool.

In accordance with a fourth embodiment of the present invention, a machine tool fluid distribution apparatus is provided. The machine tool fluid distribution apparatus comprises a booster pump, a fluid distribution system, and a controller. The booster pump is adapted for discharging, from a discharge end of the pump, fluid at a higher pressure than a fluid pressure available in a machine tool. The fluid distribution system is connected to the discharge end of the booster pump. The fluid distribution system distributes fluid from the pump to workstations on the machine tool. The fluid distribution system has multiple outlets for distributing fluid to the workstations of the machine tool. The controller is controllably connected to the fluid distribution system for controlling the fluid distribution system. The controller is adapted to use machine tool command signals for operating at least one outlet of the multiple outlets independently from another outlet of the multiple outlets of the fluid distribution system.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
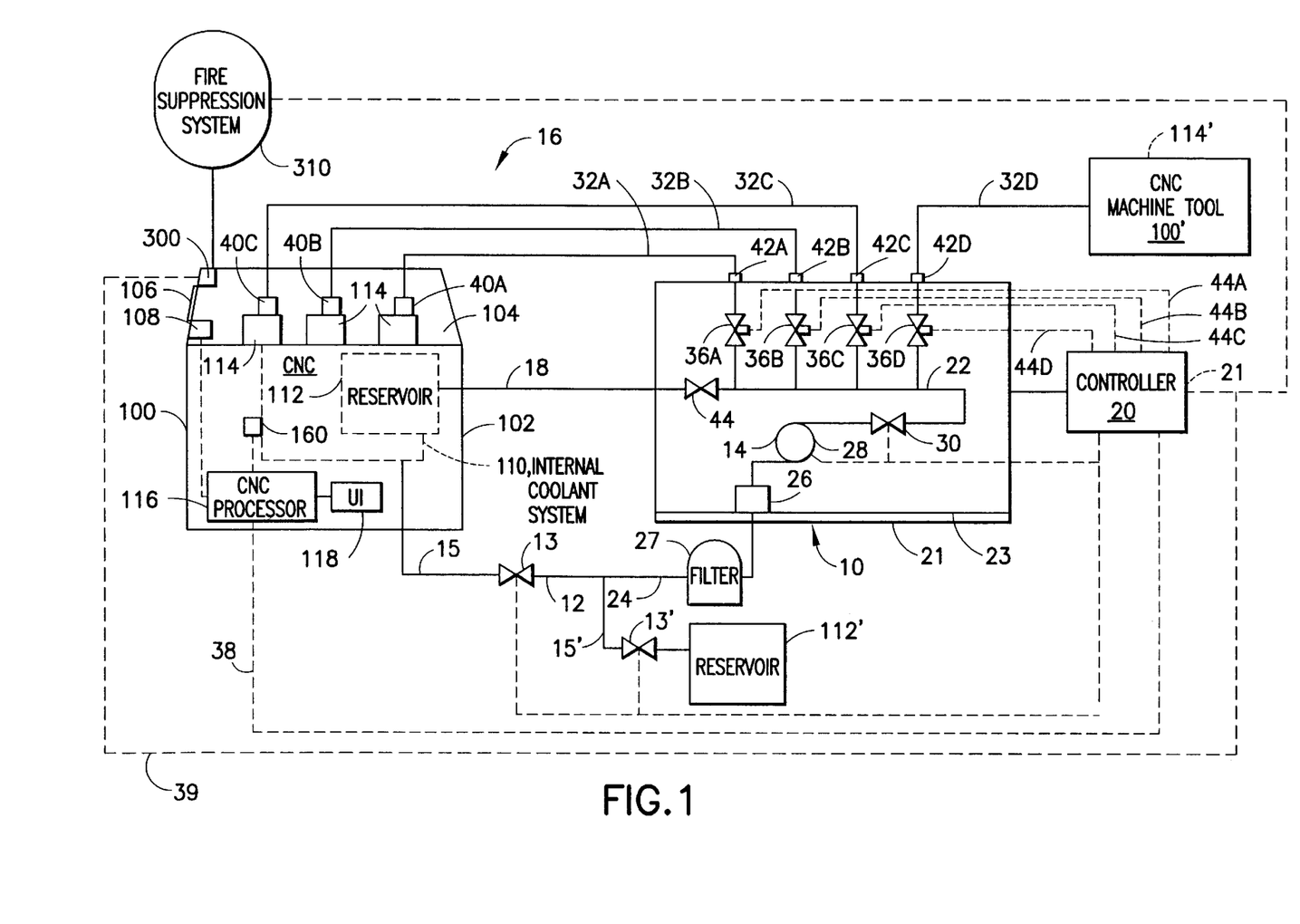
FIG. 1 is a schematic diagram of a machine tool accessory fluid distribution system incorporating features of the present invention, the fluid delivery system being connected to a CNC machine tool.

Referring to FIG. 1, there is shown a schematic diagram of a machine tool accessory fluid delivery apparatus 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 1A:
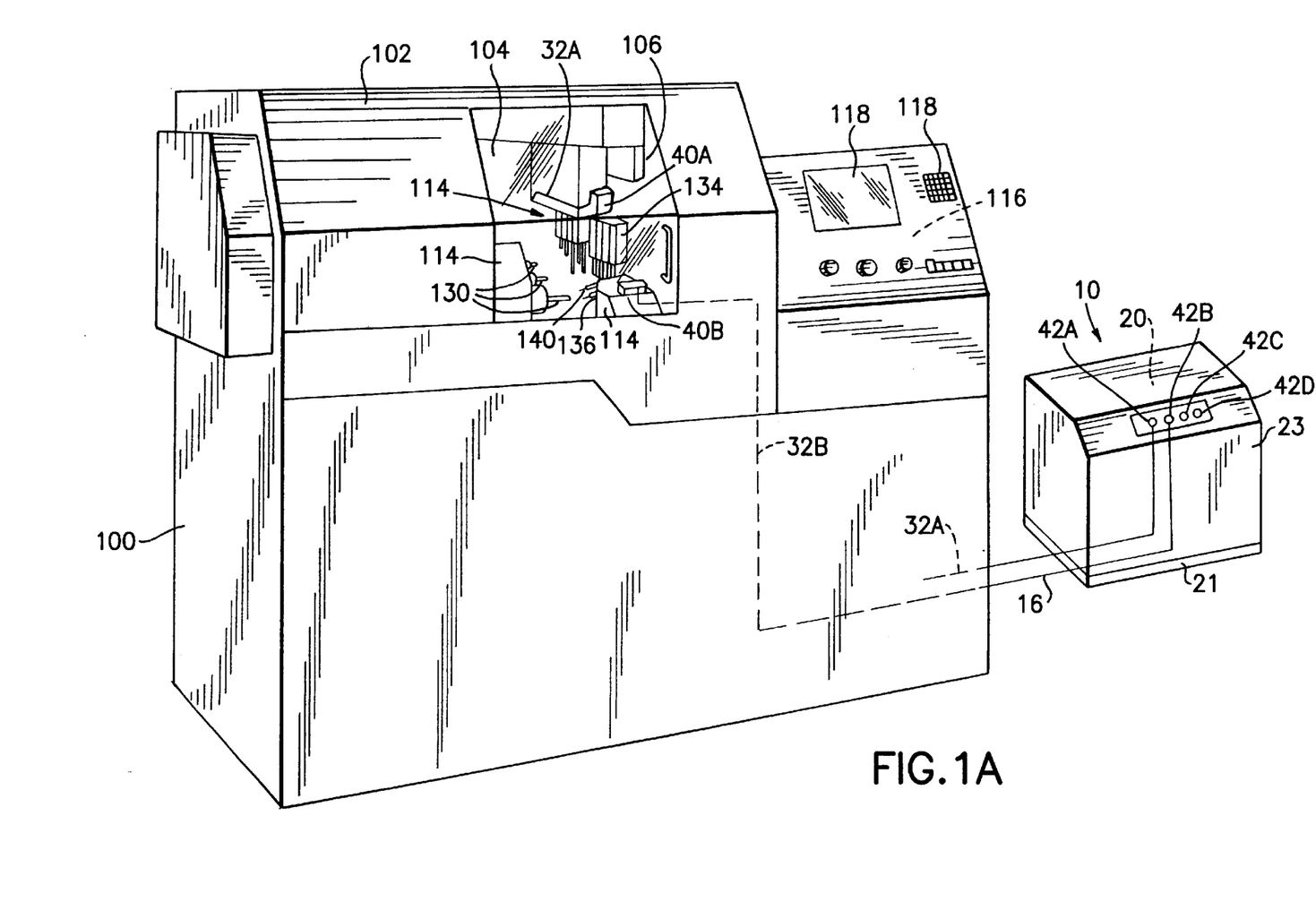
FIG. 1A is a schematic perspective view of the machine tool accessory fluid distribution system connected to the CNC machine tool.

Referring also to FIG. 1A, the accessory high pressure fluid distribution system 10 is adapted to be connected to the integral coolant system of machine tools such as computer numerically controlled machine tools (CNC), one example of which is the Citizen™ automatic lathe. The accessory high pressure fluid distribution system 10 generally comprises a supply section 12, a pump section 14, a fluid distribution network 16, a fluid overflow section 18 and a controller 20. The cooling fluid is supplied to the system 10 from a reservoir through the supply section 12. The pump section 14 provides the desired head to the cooling fluid provided by the supply section 12. The cooling fluid is then distributed via the distribution network 16 to various work stations 114, 114' of one or more CNC machine tools 100, 100'. Excess fluid is returned through the overflow section 18, which is downstream of the pump section 14, back to the fluid reservoir. The entire fluid distribution process of system 10 is controlled by the controller 20. The pump section 14, controller 20 and main manifold 22 of the fluid distribution network 18 are preferably supported by frame 21 and are housed in a single portable housing 23 mounted to the frame 21. In alternate embodiments, the pump, controller and manifold may be housed independently or otherwise in a housing fixed to the machine tool or other appropriate foundation. Power for operating the accessory fluid distribution system 10 is provided by a power line (not shown) connected preferably to a power supply of the CNC 100, though the power line may be supplied by an independent power source. It is noted that for purposes of distinguishing between fluid carrying lines and electrical lines in FIG. 1, the fluid lines, with the exception of the CNC internal fluid system 110, are shown as solid lines and the electrical lines are shown as dashed lines.

Referring now to FIGS. 1–1A, 2A–2B, the CNC machine tool 100 generally comprises a housing 102 having a work cavity or work space 104 defined therein. The work stations 114 of the machine tool 100 are located within this work space 104. The machine tool housing 102 has an access opening to allow user access to the workstations 114 in the work space 104. A door or cover 106 closes the access opening when machining is in progress. A sensor 108 is mounted on the housing 102 to detect whether the access door 106 is closed. As seen best in FIGS. 2A–2B, the CNC 100 has tools 130 at the work stations 114 to perform work on a work piece (not shown) supported within the work space 104 of the CNC. The tools 130 at the work stations 114 are preferably disposed in gang blocks 134, 136, 138 or turrets which allow for a number of tools 130 to be operated at a single position. The turrets or gang blocks 134, 136, 138 at the work stations 114 in the work space 104 are positioned to fashion outer dimensions (OD) and inner dimensions (ID) from the work pieces (not shown) handled by the CNC. By way of example, the CNC 100 schematically depicted in FIGS. 1–1A, 2A–2B, has a front OD gang block 134, a front ID gang block 136 and a rear ID gang block 138 located in the machine tool work space 104. The CNC machine tool 100 may also have work piece handling devices 142, 144 located at one or more of the work stations 114 in the work space 104. For example, the CNC machine tool may have a main spindle 142 and a rear spindle 144 used to perform turning operations (see FIG. 2A). In alternate embodiments, the CNC machine tool may have any other desired tooling or material handling features such as material/bar loaders. The CNC machine tool 100 may thus be capable of performing operations such as for example milling, front/back turning, grooving, threading and others. To perform these operations, the CNC machine tool 100 includes a processor 116 which controls the operation of the tools 130 and handling devices 142, 144 at the work stations 114 (see FIG. 1). The processor is provided with appropriate software which employs machine commands input by an operator to operate the tools 130 at the gang blocks 134–138 and spindles 142, 144 of the CNC machine tool 100. The CNC machine tool 100 further includes a user interface (UI) 118, such as for example a key board, or a touch display, which is connected to the machine tool processor 116 (see FIG. 1). The operator may input the desired machine commands in the processor 116 by using the user interface 118. The software in the machine tool processor 116 preferably has an architecture which uses M-codes for enablement/disablement of machine tool devices such as the tools 130, gang blocks 134–138 and spindles 142, 144 and also uses dimensional commands for defining the dimensions to be formed. For example, if the operator desires to perform an operation such as forming an outer diameter of a shaft, the operator may enter one or more appropriate M-codes on the user interface to activate the spindle and a suitable cutting tool on the OD gang block 134. In addition, the operator may enter the dimensional commands which specify, for example, the travel of the activated cutting tool in order to form the desired outer diameter on the shaft. Dimensional commands are thus generally entered in sequence with, and are associated with the corresponding M-codes entered by the operator. The operator may enter the M-codes and dimensional commands by, for example, selecting a feature from a menu on the touch display. In alternate embodiments, the architecture of the software in the processor may use any other suitable format of machine commands to operate the CNC machine tool features. The software of the machine tool processor 116 may be provided with at least one or more spare M-codes which are otherwise not designated for performing a specific function with the CNC machine tool 100. In the preferred embodiment, the processor has at least four spare M-codes. In the present invention, the spare M-codes, when entered by the operator into the user interface 118, are used by the controller 20 of the accessory fluid distribution system 10 to independently direct high pressure fluid to the work stations 114 of the CNC machine tool 100 as will be described in greater detail below. The CNC machine tool 100 is preferably also provided with an internal cooling system 110 generally located within the housing 102 (see FIG. 1).

Still referring to FIG. 1, the supply section 12 of the accessory fluid delivery system 10 may comprise one or more supply hoses or pipes 24 (only one is shown in FIG. 1) and appropriate fittings connecting the suction 26 on the pump section 14 to a fluid reservoir 112, 112'. In the preferred embodiment, the supply hose 24 is a flexible 1.0 inch polywire hose, though any other suitable hose or pipe of suitable size may be used. The supply hose 24 is connected to the internal cooling system 110 of the CNC 100. The internal cooling system 110 of the CNC machine tool has a coolant fluid reservoir 112. The supply hose 24 may be connected with, for example, a T type fitting, to a suitable section of the supply portion of the internal cooling system 110 (i.e. downstream of the reservoir 112) of the CNC machine tool 100. The supply section 12 draws cooling fluid from the internal reservoir 112 of the CNC machine tool 100. In addition, the supply section 12 of the auxiliary cooling system 10 may draw coolant from an independent reservoir 112' (see FIG. 1). The coolant in the independent reservoir 112' may be different than that stored in the reservoir 112 of the CNC. The supply section 12 has a pair of solenoid valves 13, 13' for isolating the respective branches 15, 15' of the supply section 12 as desired. For example, when coolant is drawn from the internal reservoir 112 of the CNC machine tool 100, valve 13 is open and valve 13' is closed isolating independent reservoir 112'. Conversely, when coolant is to be drawn from the independent reservoir 112', valve 13' is open and valve 13 is closed isolating the supply section 12 from the internal reservoir 112 of the CNC machine tool 100. Thus, the supply system may be connected to two or more reservoirs 112, 112' holding different types of cooling fluids. The solenoid valves 13, 13' are controlled by the controller 20. In alternate embodiments, the supply section of the accessory fluid distribution system may connected to any number of reservoirs. The supply section 12 further comprises a particulate filter 27 mounted preferably off the frame 21 and located outside the housing 23, though the filter may be located anywhere along the supply section run. In the preferred embodiment, the filter 27 includes a seven gallon container filter with a No. 12 bag which provides filtration for particles up to 100 micron. In an alternate embodiment, any other suitable type of filtering device may be used. For example, a fluid separator may be used in addition to or in place of the particulate filter. Also, a series of particulate filters may be used, each being progressively more effective to filter small particles. The filter 27 has an indicator (not shown) which identifies when the filter bag should be changed.

The supply section 12 is connected at its upstream end to the suction end 26 of the pump section 14 of the accessory fluid distribution system 10. The pump section 14 comprises one or more high pressure pumps 28 (only one pump 28 is shown) of suitable type such as for example positive displacement pumps. The pumps 28 are preferably driven by electric motors suitably sized so that the pumps may generate fluid pressures of more than 3500 psi at flow rates of more than 6 GPM if desired. The pressure of the coolant fluid delivered by the pump section 14 to the main manifold 22 of the distribution network 16, may be adjusted by a regulator 30. The flow rate delivered by the pumps is substantially constant, though, the fluid pressure varies. Generally, the pressure of the coolant discharged from the pump section 14 of the accessory fluid distribution system 10 may be significantly higher the fluid pressure otherwise delivered by the internal coolant system of the CNC machine tool 100. The regulator 30 is controlled by the controller 20.

Figure 2A:
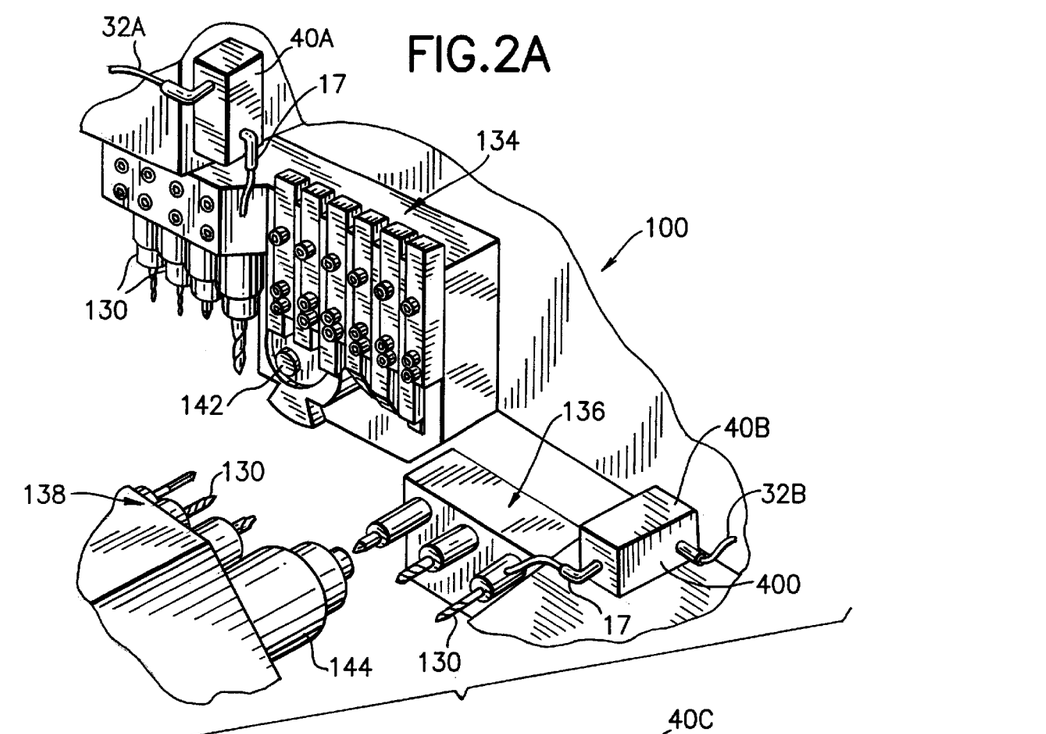
FIGS. 2A–2B are a partial perspective views of distribution manifolds of the distribution system shown in FIG. 1, the distribution manifolds being mounted respectively at several work stations of a CNC machine tool.
Figure 2B:
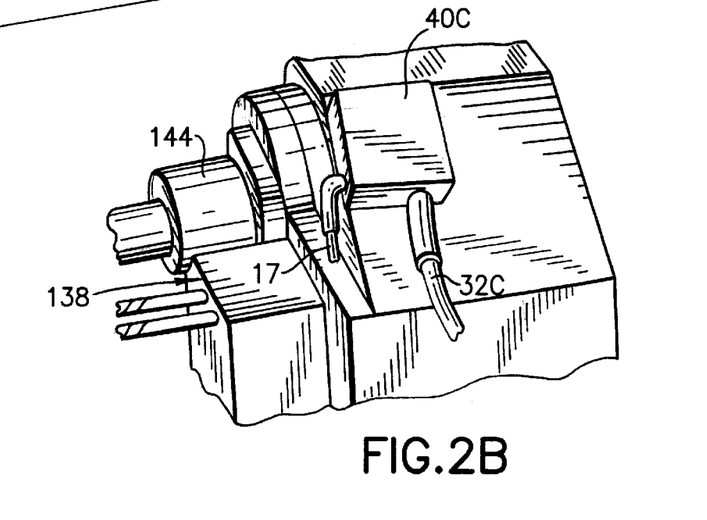

Referring again to FIGS. 1–1A, 2A–2B, the pump section 14 discharges high pressure coolant into the coolant distribution network 16 of the accessory coolant distribution system 10. The coolant fluid distribution network 16, generally comprises the main manifold 22, independent feed lines 32A–32D, and discharge manifolds 40A–40C. The main manifold section 22 has multiple independent outlets or output ports 42A–42D which distribute the high pressure fluid discharged by the pump section 14 to the feed lines 32. The independent feed lines 32A–32D connect the independent ports 42A–42D on the main manifold 22 to discharge manifolds 40A–40C located at work stations 114, 114' on one or more of the CNC machine tools 100, 100'. Although the main manifold 22 is depicted in FIG. 1 as having four independent ports 42A–42D, in alternate embodiments, the main manifold may have any suitable number of independent ports which may independently distribute fluid to any suitable number of discharge manifolds. Each feed line 32A–32D is preferably made from stainless steel braided flexible tubing. The diameter of the tubing may be about 3/16" though any suitable sized tubing may be used. Each feed line 32A–32D is provided at each end with suitable mechanical fittings (not shown), such as unions for example, for removably connecting the line 32A–32D to a corresponding output port 42A–42D on the manifold 22 and to a corresponding discharge manifold 40A–40C at one of the work stations 114. The feed lines 32A–32D may also be connected with appropriate fittings to discharge high pressure coolant from the system 10 through coolant discharge orifices of the CNC machine tool 100, 100'. For example, the main spindle 142 of the CNC machine tool 100 may be provided with an integral passage (not shown) having a suitable opening to which one of the feed lines 32A–32D may be attached. High pressure fluid from the feed line 32A–32D may thus be discharged through the passage in the main spindle 142 of the CNC machine tool 100. Similarly, the collets or chucks holding the tools 130 may have grooves or channels formed therein (not shown). The feed lines 32, may thus be connected to these grooves in the tool collets, or in the spindle using suitable fittings (not shown) in order to supply high pressure fluid from the system 10 generally directly into the working regions of the tools. The feed lines 32A–32D may be disconnected from and rearranged to supply different discharge manifolds 40A–40C or discharge openings of the CNC 100 as desired. As shown in FIGS. 2A–2B, in the preferred embodiment, discharge manifolds 40A–40C are mounted to the machine tool housing 102 adjacent respectively to the OD gang block 134, the front ID gang block 136, and the rear ID gang block 138. Nozzles 17 extending from the manifolds 40A–40C may be pointed to direct high pressure fluid to one or more of the tools 130 of the corresponding gang blocks 134–138. The discharge manifolds 40A–40C are attached to the machine tool housing 102 using mechanical fasteners such as screws, or bolts.

The main manifold 22 of the coolant distribution network 16 includes solenoids 36A–36D located on the manifold to independently open and close each of the ports 42A–42D to each feed line 32A–32D. Alternatively, appropriate valves may be used in conjunction with the solenoids or in place of the solenoids to independently regulate the flow through each of the ports to each feed line 32. Thus, the flow in each feed line 32A–32D may be turned on or off or otherwise regulated independently in pressure and flow. The valves or solenoids 36A–36D controlling the flow in each of the feed lines 32A–32D are in turn controlled from the controller 20, or otherwise may be operated manually by the user.

Figure 4:
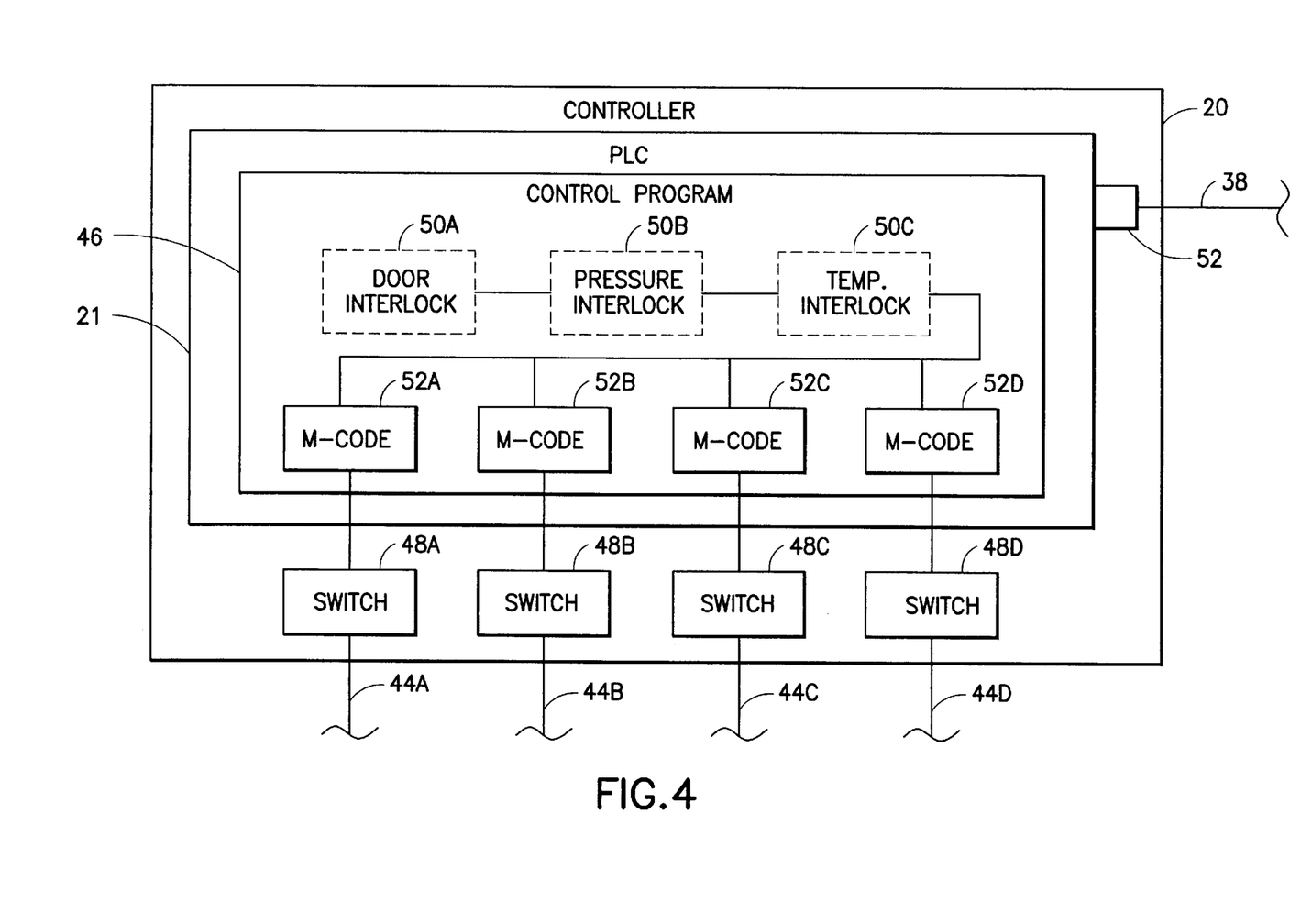
FIG. 4 is a schematic diagram of a controller of the accessory fluid distribution system shown in FIG. 1 in accordance with a first preferred embodiment of the present invention.

Referring now to FIGS. 1 and 4, the controller 20 of the accessory high pressure fluid delivery system 10 incorporates a programmable logic controller (PLC) 21 such as for example the Koyo Direct Logic DL 105 micro-PLC, though any other suitable programmable logic controller may be used. The PLC 21 is operably connected to the solenoids 36A–36D on the main manifold 22 and the valve controlling flow through the overflow line 18. The PLC 21 may also be operably connected to the valves 13, 13' on the supply section 12 of the accessory coolant system 10. The PLC 21 may be programmed to energize and de-energize the system 10, and to independently turn a given feed line 32A–32D on and off by operating the solenoid 36A–36D corresponding to that feed line. The PLC 21 may also be programmed to independently vary the feed pressure in each feed line to each work station as desired. The PLC 21 may be further adapted to be programmed to select the coolant fluid delivered in each of the feed lines 32A–32D from several different types of fluids. The PLC 21 may also interface either directly or over a standard data transfer network (e.g. the Internet) with remote control stations such as the processor 116 and user interface 118 of the CNC machine tool 100 or a computer terminal (not shown). Thus, the controller 20 may be programmed or otherwise accessed remotely from any station with which the PLC 21 is interfaced. In the preferred embodiment, the PLC 21 has an input/output (I/O) connector 52 adapted to receive a communication cable 38 coupled to the processor 116 and user interface 118 of the CNC machine tool 100. This allows the operator to remotely enter commands to the PLC 21 of the accessory fluid system 10 from the user interface 118 of the CNC 100. In alternate embodiments, the PLC of the accessory fluid system may interface with remote control stations such as the CNC user interface or an independent computer terminal using RF or IR data links. The PLC 21 may be provided with a local user interface (not shown) so that a user may directly program the PLC 21. The PLC 21 is programmed with software 46 to operate switches 48A–48D in the controller 20 which respectively actuate the corresponding solenoids 36A–36D via cables 44A–44D (see FIGS. 1 and 4). Hence, the controller 20 is capable of independently opening and closing the solenoid valves 36A–36D, thereby independently controlling the fluid discharged through each of the ports 42A–42D of the main manifold 22. In alternate embodiments, the switches controlling the position of the solenoid valves may be located outside the controller. In other alternate embodiments, the controller of the accessory fluid system may be provided with any other suitable position control means, such as for example rheostats operating step motors, for independently opening and closing the solenoid valves of the distribution network.

The software 46 in the PLC 21 is preferably formatted to use spare M-code commands 52A–52D, provided in the programming of the CNC processor 116, to operate the switches 48A–48D. As shown in FIG. 4, the PLC software 46 uses separate M-codes 52A–52D to open/close respective switches 48A–48D, and hence independently open/close the corresponding solenoid valves 36A–36D (see also FIG. 1) As noted above, the M-codes 52A–52D may be inputted into the PLC 21 by the operator from the CNC user interface 118. In response to the inputted M-codes 52A–52D, the software 46 in the PLC 21 activates the corresponding switches 48A–48D. The M-codes 52A–52D operate as software toggles, the PLC software 46 cycling the corresponding switch 48A–48D and associated solenoid valve 36A–36D from open to closed or vice-versa each time a respective M-code is input by the operator. In alternate embodiments, the PLC software may be formatted to use any other suitable commands to operate the switches controlling the position of the solenoid valves.

Preferably, the PLC software 46 is provided with several electronic interlocks 50A–50C which prevent operation of the accessory fluid system 10 under certain conditions. The interlocks 50A–50C are in a closed or enabled position to allow the operation of the accessory fluid system 10. If one or more interlocks 50A–50C are open, the software 46 will not operate the switches 48A–48D and will not energize the pump section 14 of the fluid system 10. In addition, if the pump section 14 of the fluid system 10 is energized and one or more interlocks 50A–50C is opened by the software 46, the PLC 21 will de-energize the pump section 14 to stop operation of the fluid system. In the preferred embodiment, the PLC software 46 has interlock 50A to prevent operation of the fluid system 10 if the machine tool work space door 106 is open, interlock 50B preventing operation when the machine tool internal coolant system 110 is not pressurized (see FIG. 1), and interlock 50C preventing operation if one or more temperature or heat sensors 300 are activated. As shown in FIG. 1, the machine tool door sensor 108 and the internal fluid system pressurization sensor 160 may be connected to the PLC 21 via cable 38 or any other suitable data links to respectively signal the PLC 21 when the door 106 is closed and when the fluid system 110 of the CNC 100 is pressurized. The temperature or heat sensors 300 signal the PLC 21 when a predetermined temperature is detected in the work space 104 of the CNC 100. Interlocks 50A and 50B are initially in an open or disabled position, and are closed by the PLC software 46 upon receiving signals from sensors 108, 160 respectively that the door 106 is closed and that the internal coolant system 110 is pressurized. Interlock 50C is initially in the closed position and is opened by the PLC software upon receiving signals from temperature or heat sensors 300. In alternate embodiments, the PLC 21 may have any other suitable electronic interlocks. For example, the PLC may be provided with an interlock which opens, thereby preventing operation of the accessory fluid system, when the operator inputs the M-code command which causes the CNC to index a turret or gang block. In other alternate embodiments the controller may be provided with electro-mechanical interlocks.

The method for independently directing high pressure cooling fluid to workstation 114 of the CNC 100 using the accessory fluid distribution system 10 will be described below with reference to the flow chart shown in FIG. 5. In block P1, the feed lines 32A–32D of the distribution system 16 are individually connected to the corresponding discharge manifolds 40A–40C or coolant discharge orifices (not shown) of the CNC 100. In block P2, the tubing of the supply section 12 is connected to the internal cooling system 110 of the CNC 100 and to any other desired independent fluid reservoir 112'. In block P3, the communication cable 38 from the CNC processor 116 is mated to the I/O port 52 of the PLC 21 (see FIG. 4). With the communication cable 38 connected to the PLC 21, the operator may input the desired M-code, block P4, using the CNC user interface 118 programming the PLC 21 to direct coolant from the accessory fluid system 10 to a desired location. By way of example, the operator may desire to perform a given machining operation, such as forming an outside dimension with a suitable tool 130 of the OD gang block 134 (see FIGS. 1A, 2A), and to provide high pressure coolant from the discharge manifold 40A adjacent to the OD gang block. Accordingly, the operator enters the M-codes and dimensional commands for operating the appropriate tool of the OD gang block 134. The operator, as per block P4 of FIG. 5, then also enters spare M-code 52A on the user interface 118 of the CNC 100. The spare M-code 52A is not used by the CNC processor 116, but instead is transmitted by the processor via communication cable 38 to the PLC 21 of the accessory fluid system 10. In block P6 of FIG. 5, the PLC software 46 recognizes the M-code 52A and in response sends a signal to the corresponding switch 48A which opens/closes the switch. In this case, the PLC 21 closes the switch 48A in response to receiving the M-code 52A. Closing the switch 48A in turn causes the solenoid of the corresponding solenoid valve 36A to move from the closed to the open position thereby opening the valve allowing coolant to flow through port 42A to discharge manifold 40A. In block P7 of FIG. 5, the PLC interlocks 50A–50C are closed enabling the PLC 21 to energize to booster pump section 14 sending high pressure coolant through port 42A to discharge manifold 40A.

Figure 5:
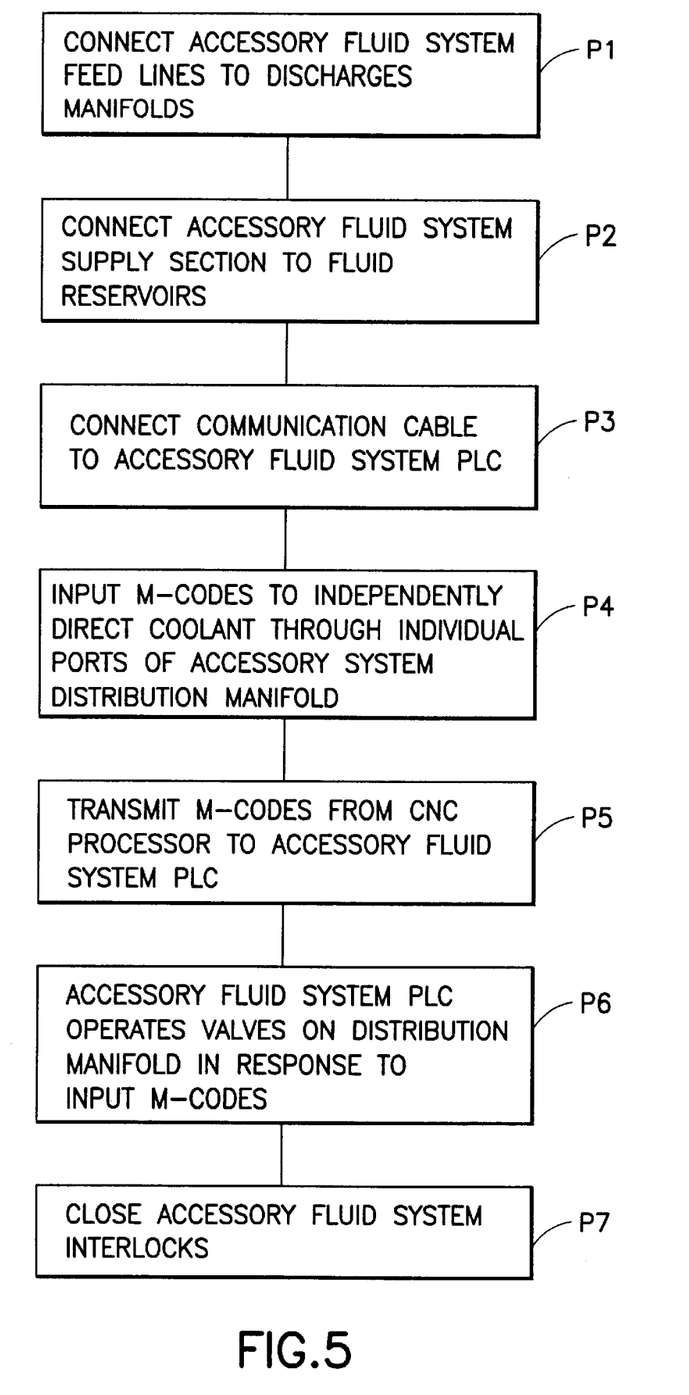
FIG. 5 is a flow chart pictorially depicting a method for operating the fluid distribution system in FIG. 1 to supply high pressure fluid to discharge manifolds.
Figure 6:
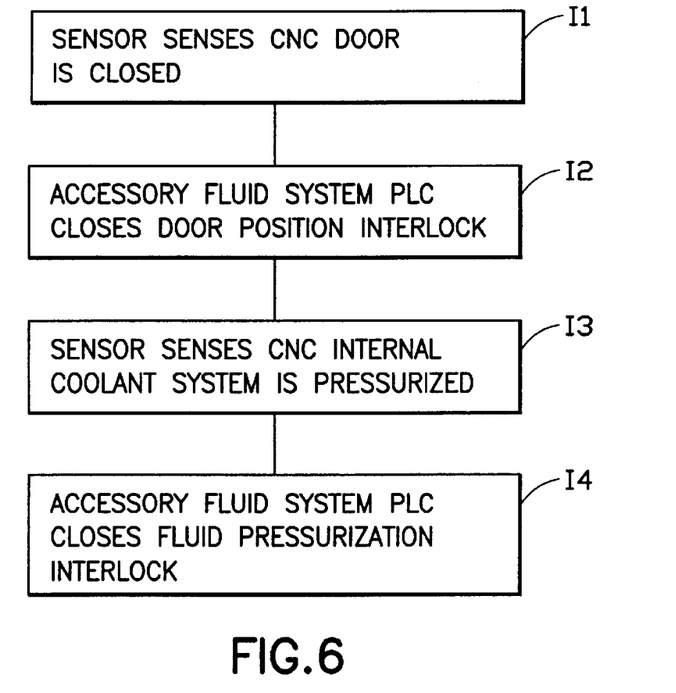
FIG. 6 is a flow chart pictorially depicting a sub-method for performing the step in FIG. 5 of closing interlocks of the distribution system controller shown in FIG. 4.

Referring now to FIG. 6, there is shown a flow chart pictorially depicting the method included in block P7 of FIG. 5 for closing the PLC interlocks 50A–50C. In block I1, the work space door 106 is closed and the sensor 108 sends a door closed signal to the PLC 21 (see also FIGS. 1–1A). This signal causes the PLC software 46 to close interlock 50A, block I2. In block I3, the operator energizes the sump pump (not shown) pressurizing the internal coolant system 110 of the CNC 100. This is sensed by sensor 160 which in turn sends a suitable signal to the PLC 21. In response, in block I4 of FIG. 6, the PLC software 46 closes interlock 50B. As noted previously, interlock 50C is initially in the closed position and is opened when the PLC 21 receives a signal from the smoke sensors as will be described below.

To independently direct high pressure coolant to any additional discharge manifolds 40A–40C or discharge openings, the steps in blocks P4–P6 of FIG. 6 are repeated as desired. For instance, if the operator chooses to discharge high pressure coolant from discharge manifold 40B, adjacent to the front ID gang block 136 (see FIGS. 1, 1A and 4), the operator enters into the CNC user interface 118 the appropriate spare M-code 52B corresponding to activation of solenoid valve 36B. The spare M-code 52B is transmitted to the PLC 21, block P5, and causes the PLC software 46 to cycle open solenoid valve 36B independently supplying coolant to discharge manifold 40B. The operator may close any of the open solenoid valves 36A–36D without interrupting the flow to discharge manifolds through the solenoid valves remaining open. To close a desired solenoid valve 36A–36D, the operator again enters the appropriate M-code 52A–52D which toggles open the corresponding switch 48A–48D thereby shutting the associated solenoid valve. For example, solenoid valve 36A, supplying coolant to discharge manifold 40A, may be closed by the operator again entering M-code 52A into the CNC user interface 118. The M-code 52A is transmitted to the PLC 21, in response to which the PLC software 46 toggles the switch 46A open causing the solenoid valve 36A to cycle closed and stopping the coolant supply to discharge manifold 40A. However, flow through the other open solenoid valve 36B remains uninterrupted, independently supplying discharge manifold 40B with high pressure coolant. Table 1 below provides a sample sequence of M-codes which may be entered by an operator on the CNC user interface 118 to operate the tools 130 of the CNC 100 and independently supply high pressure fluid to several discharge manifolds 40A, 40B of the accessory fluid system 10.

TABLE 1

| M-code Input | Corresponding Action |
| --- | --- |
| M-1/T1200/GOX.120Z-.05T | CNC selects tool and moves tool according to input dimensional commands |
| M-52A | PLC opens solenoid valve 36A supplying manifold 40A |
| G1Z0F.003/X.220F.0015 | CNC moves tool according to new input dimensional commands |
| M-52B | PLC opens solenoid valve 36B supplying manifold 40A |
| M-52A | PLC closes solenoid valve 36A |
| M-52B | PLC closes solenoid valve 36B |

The solenoid valve 36B need not be opened prior to closing solenoid valve 36A, though in the case where one valve 36A–36D is open, it is preferable to open the second valve 36A–36D before shutting the first valve to avoid constant quick starting/stopping of the pump section 14 of the accessory fluid distribution system 10. The program sequence input by the operator, as that shown in Table 1, may preferably be entered at any time before or during operation of the CNC.

Figure 4A:
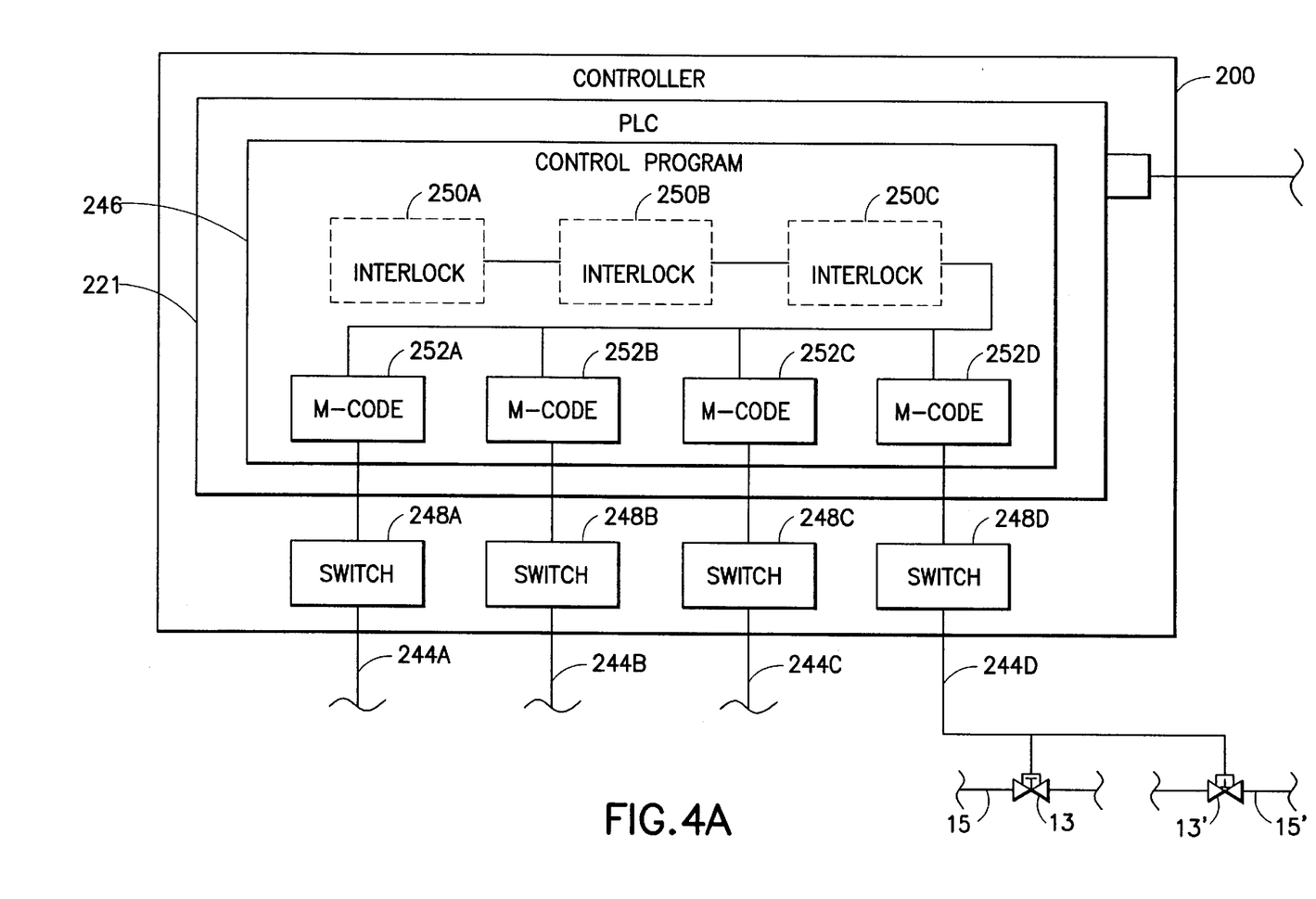
FIG. 4A is a schematic diagram of a controller of the accessory fluid distribution system in FIG. 1 in accordance with a second preferred embodiment of the present invention.

Referring now to FIG. 4A, there is shown a schematic diagram of the controller 200 of the accessory fluid system 10 in accordance with a second preferred embodiment of the present invention. The controller 200 in the second preferred embodiment is substantially similar to the controller 20 shown in FIG. 4 and described above. Similar features of the controllers in the first and second embodiments are similarly numbered. The controller 200 has a PLC 221 with software 246 having electronic interlocks 250A–250C and formatted to use spare M-codes 252A–252D of the CNC processor 116. The PLC software 246 uses the M-codes 252 to open/close switches 248A–248D of the controller 220. Switches 248A–248C are operably connected via lines 244A–244C to cycle corresponding solenoid valves of the main manifold 22 (see also FIG. 1). In addition, in this second preferred embodiment, at least one of the switches 248D is operably connected via line 244D to valves 13, 13' on the supply line 12 of the accessory fluid system 10. Valves 13, 13', which may be solenoid valves, have the spring loaded solenoid actuator installed in a reverse orientation relative to each other. For example, valve 13 may have the actuator installed so that the valve is normally open and is then closed when actuated by the PLC 221. Conversely, valve 13' may have the actuator installed so that the valve is normally closed and is then opened when actuated by the PLC 221. Thus, when M-code 252D is received by the PLC 21 and switch 248D is closed sending power to the solenoid valves 13, 13', valve 13 closes and valve 13' opens allowing the supply section to access the coolant in the independent reservoir 112'. The operator may thus select to independently supply different discharge manifolds 40A–40C with different types of coolant. In alternate embodiments, one or more of the switches in the controller may be connected to simultaneously operate a main manifold solenoid valve and a valve on the supply section of the accessory fluid system.

The coolant in the system 10 may be cutting oil or water soluble cutting fluid, though any other suitable type of fluid may be used. It is desirable that the coolant in the fluid distribution system 10 have a viscosity of about SUS 140 at 100° F., though suitable coolants of higher or lower viscosity may be used. For example, cutting oils such as Castrol™ Ilocut No. 5721 or Hangsterfers™ HardCut 525 LIGHT and HardCut 5258 LIGHT may be used. For water soluble fluids, a miner oil base fluid such as Blaso-Cut™ may be used. Anti-foaming agents may be used with the cutting fluid in the system 10 as desired to prevent aeration and foaming of the fluid due to high pressure discharge of the system. The anti-foaming agents may introduced to the fluid in the system 10. In addition, any other suitable coolant agent may be used in the system 10 regardless of viscosity.

Figure 7:
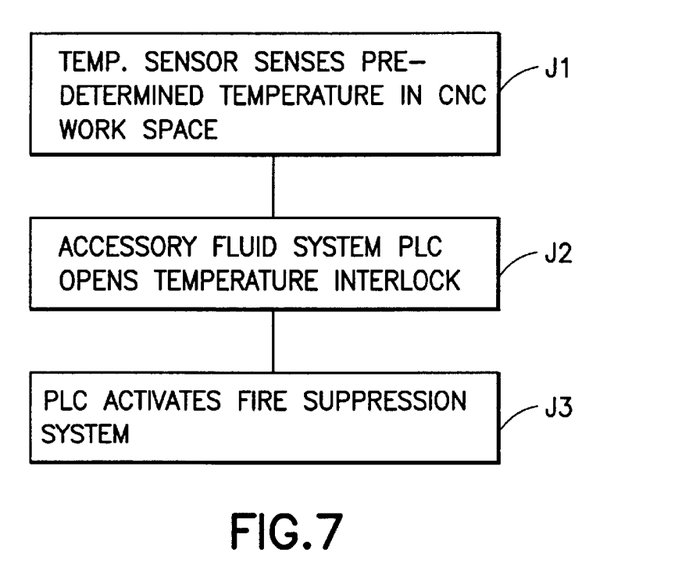
FIG. 7 is a flow chart pictorially depicting a method for actuating a fire suppression system in accordance with the present invention.

As noted previously, it is within the scope of the present invention to provide the CNC 100 with one or more temperature or heat sensors 300. Referring again to FIG. 1, the temperature sensors 300 (only one is shown) are mounted in suitable areas of the work space 104. The temperature sensors 300 are connected, preferably via a suitable cable 39, though any other transmission means may be used, to the controller 20 of the accessory fluid system 10. FIG. 7 shows a flow chart pictorially depicting the use of the heat sensors by the PLC of the accessory fluid distribution system. The temperature sensors 300 may have an adjustable set point, or otherwise may be preset to send a signal when a predetermined high temperature is sensed, block J1 of FIG. 7. As noted previously, the signal from the temperature sensors 300 transmitted via the cable 39 to the PLC 21, causes interlock 50C (see also FIG. 4) to go from the closed position to the open or disabled position, block J2 of FIG. 7. When the interlock 50C is rendered in the open or disabled position, the PLC software 46 opens switches 48A–48D thereby closing the main manifold valves 36A–36D, and de-energizes the pump section 14 shutting flow of coolant from the accessory system 10 to the work space 104 of the CNC 100. The accessory fluid system may be provided with an audible and visual alarm 302 which is also activated by the PLC 21 when the interlock 50C is in the open position. In addition, a fire suppression system 310, such as for example a halon system or a system using any other suitable fire suppression material which may be included with the accessory fluid system 10 may be activated by the PLC 21, block J3 of FIG. 7, when the interlock 50C is set to the open position by signal from the heat sensors 300.

Figure 3A:
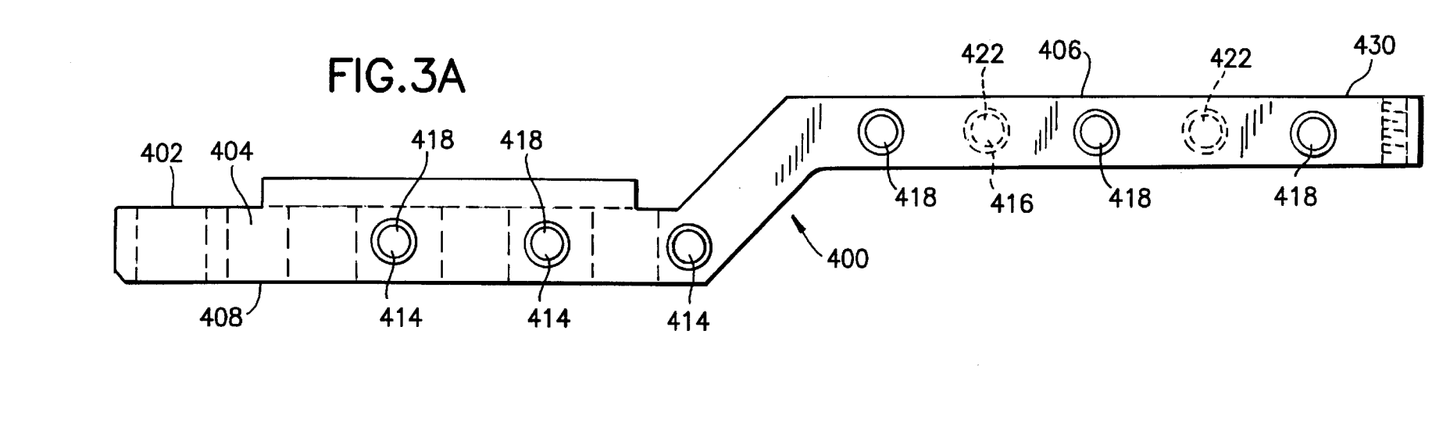
FIGS. 3A–3B are respectively a side elevation view and a top plan view of a quick change manifold of the accessory fluid distribution system in FIG. 1.
Figure 3B:
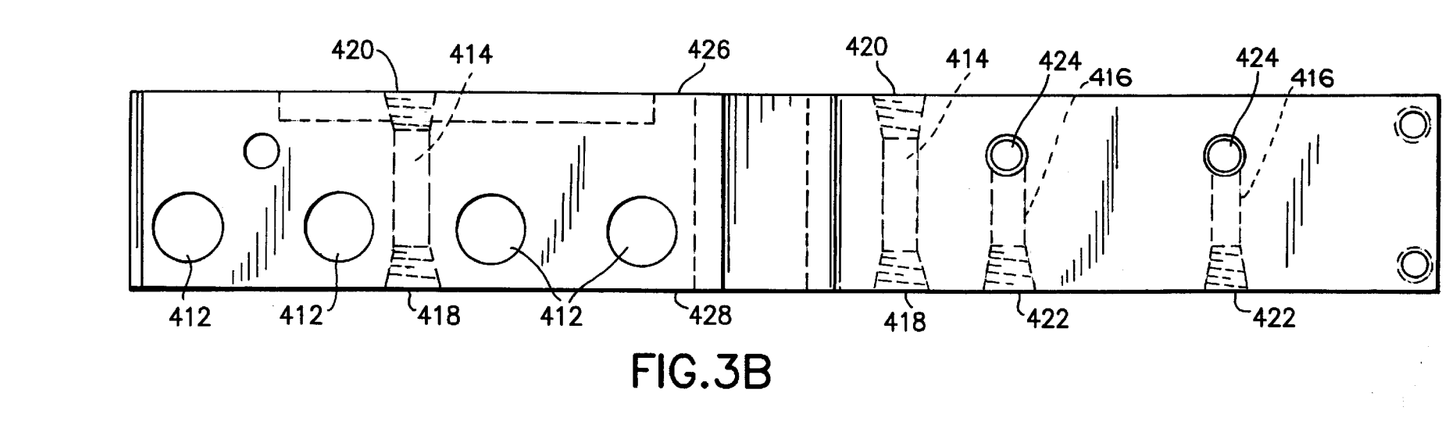

Referring now to FIGS. 3A–3B, there are shown respectively a front elevation view and a top plan view of a quick change manifold 400 included in at least one of the distribution manifolds 40A–40C of the accessory fluid system 10 shown in FIGS. 1–1A. The quick change manifold generally comprises a manifold block or plate member 402. In the preferred embodiment the block 402 has a base portion 404 and an upper portion 406 generally offset and depending from the base portion. The base portion 404 has a seating surface 408 adapted to be seated against a suitable surface in the work space 104 of the CNC 100 (see FIG. 1A) when the manifold 400 is mounted thereto. Mounting holes 412 are provided in the base portion 404 to allow the manifold 400 to be fastened to the CNC 100 using suitable mechanical fasteners. In alternate embodiments, the quick release manifold block may have any other suitable shape. The manifold block 402 has flow passages 414, 416 formed therein. Passages 414 are through bores which extend substantially straight from one side 428 to the other side 426 of the manifold block. In the preferred embodiment three passages 414 are located in the base portion 402, and three passages 414 are located in the upper portion 406 of the block. Alternate embodiments may include any suitable number of straight flow passages. The passage openings 418, 420 respectively formed in sides 426, 428 of the block are generally threaded to mate with a suitable mechanical pipe fitting. One opening 418, 420 of each flow passage 414 serves as an inlet to which a feed line 32A–32D of the system 10 (see FIG. 1) is removably connected. The opposite opening 418, 420 serves as an outlet to which a suitable nozzle 17 (see FIGS. 2A–2B) may be attached. Both openings 418, 420 of each passage 414 may be used as either inlet or outlet as desired. Flow passages 416 have a general elbow configuration. In the preferred embodiment, two elbow passages 416 are located in the block upper portion 406, the passages having about a 90° bend. In alternate embodiments the manifold block may use any suitable number of elbow passages which are bent at any suitable angle. Each of the elbow passages 416 has an opening 424 in the top surface 430, and an opening 422 in side 428 of the block 400. Both openings 422, 424 are threaded to accept a mating pipe fitting, and either opening may serve as inlet and outlet. Referring now also to FIGS. 2A–2B, nozzles 17 may be connected to the outlets. Any of the feed lines 32A–32D of the system 10 may be removably connected to any of the elbow passage inlets. Thus, a feed line 32A–32D connected to an inlet of a flow passage 414, 416, individually supplies the nozzle connected to the outlet of that flow passage.

Each nozzle 17 installed in an outlet of a flow passage 414, 416 of the quick release manifold 400 may be preformed to direct flow to a discrete area in the work space 104, such as for example at the cutting edge of a specific tool 130 (see FIGS. 2A–2B). To supply high pressure coolant to one of these discrete areas, the operator merely connects one of the feed lines 32A of the discharge section 16 to the inlet of the flow passage 414, 416 supplying the nozzle 17 directed to that area. The operator then operates the system 10 as noted previously. In this manner substantially the entire high pressure coolant stream from the system 10 may be discharged at one discrete area in the work space of the CNC 100. To supply high pressure coolant to a different discrete area, the operator may connect another feed line 32B to the inlet of a different flow passage 414, 416 having an attached nozzle 17 directed at the different area. Otherwise, the operator may disconnect and reconnect feed line 32A to the inlet of the different passage 414, 416 and then continue to operate the system 10 to discharge the high pressure stream at the different discrete area. The quick change manifold 400 thus enables the operator of the system 10 to independently supply high pressure coolant to individual discharge manifolds 40A–40C, and further to independently supply high pressure coolant to individual nozzles 17 supplied by the quick release manifolds 400.

Unlike fluid distribution systems of the prior art, the present invention provides individual on/off control of each nozzle 17 of a discharge manifold 40A–40C of the accessory fluid distribution system 10. In the present invention, the individual on/off control of each nozzle 17 is effected from the PLC 21, 221 which may be programmed in advance from the user interface 118 of the CNC 100. This allows the operator to include coolant distribution as part of the machining process. High pressure coolant provided by discharging substantially the entire high pressure stream generated by the accessory fluid system from an individual nozzle at a specific CNC tool 130 or work area assists in breaking up long chips generated during machining and in the formation of fine chips. In addition, the fine chips are readily removed from the work site by the high pressure stream so that the tool may continue cutting the work piece without interference from chips. The independent control of coolant down to the individual nozzle of the discharge manifolds allows the operator to accurately control the coolant volume being delivered to a particular work site. This enables the operator to effectively control the temperature of the work piece during close tolerance machining. By effectively controlling the temperature of the work piece, the dimensional stability of the finished product is maintained resulting in little or no rejected parts.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A machine tool accessory fluid distribution apparatus comprising:
    a booster pump adapted for discharging, from a discharge end of the pump, fluid at a different pressure than a fluid pressure available in a machine tool;
    a fluid distribution system connected to the discharge end of the booster pump for distributing fluid from the pump to workstations of the machine tool; and
    a controller controllably connected to the fluid distribution system for controlling fluid distribution to the workstations of the machine tool;
    wherein, the controller controls fluid delivered by the apparatus to at least one of the workstations independently from fluid delivered by the apparatus to another one of the workstations of the machine tool.

2. A machine tool accessory fluid distribution apparatus in accordance with claim 1, wherein the controller has a connector for connecting a processor of the machine tool to the controller, the controller being adapted for using command signals transmitted from the machine tool processor for selecting the at least one of the workstations to which fluid is delivered independently by the accessory fluid distribution apparatus.

3. A machine tool accessory fluid distribution apparatus in accordance with claim 1, wherein the controller has a connector for connecting a user interface of the machine tool to the controller, so that, the controller is programmed to select the at least one of the workstations to which fluid is delivered independently by the accessory fluid distribution apparatus from the user interface of the machine tool.

4. A machine tool accessory fluid distribution apparatus in accordance with claim 1, wherein the controller has a connector for connecting machine tool sensors to the controller, and wherein the controller has interlocks therein which use signals from the machine tool sensors.

5. A machine tool accessory fluid distribution apparatus in accordance with claim 1, further comprising a thermal sensor mounted at a predetermined location on the machine tool and being connected to the controller of the apparatus, and wherein the controller deactivates the apparatus when the thermal sensor senses a predetermined temperature.

6. A machine tool accessory fluid distribution apparatus in accordance with claim 1, wherein the controller is controllably connected to the booster pump.

7. A machine tool accessory fluid distribution apparatus in accordance with claim 1, wherein the fluid discharged from the discharge end of the booster pump has a higher pressure than the fluid different than the fluid pressure available in the machine tool.

8. A machine tool accessory fluid distribution apparatus in accordance with claim 1, wherein the fluid distribution system comprises:
    a multi-port output manifold, each output port of the multi-port manifold being controlled independently by the controller, and being connected to supply a supply line corresponding to the port; and
    a quick change manifold having multiple inlets and multiple outlets, each inlet being adapted for receiving any supply line corresponding to the output ports of the multi-port manifold, each outlet supplying a corresponding nozzle at one of the workstations;
    wherein, each inlet of the quick change manifold communicates with only one corresponding outlet.

9. A machine tool accessory fluid distribution apparatus in accordance with claim 8, wherein the quick change manifold is located at the machine tool.

10. A machine tool accessory fluid distribution apparatus comprising:
    a frame;
    a booster pump mounted to the frame, the booster pump being adapted for providing, from a discharge end of the pump, fluid at a higher pressure than a fluid pressure available in a machine tool;
    a fluid distribution system connected to the discharge end of the booster pump for distributing fluid from the pump to workstations on the machine tool, the fluid distribution system comprising a manifold section with a multi-port output mounted to the frame, and a tubing section connecting the multi-port output to the workstations; and
    a controller mounted to the frame, the controller being controllably connected to the fluid distribution system for controlling fluid distribution to the workstations of the machine tool;
    wherein, the controller controls fluid delivered through the multi-port output of the fluid distribution system to at least one of the workstations independently from fluid delivered through the multi-port output to another one of the workstations of the machine tool.

11. A machine tool accessory fluid distribution apparatus in accordance with claim 10, wherein the tubing section comprises tubes connecting each port of the multi-port output to a fluid discharge at a corresponding one of the workstations of the machine tool.

12. A machine tool accessory fluid distribution apparatus in accordance with claim 10, wherein the controller has a connector for connecting a processor of the machine tool to the controller, the controller being adapted for using command signals transmitted from the machine tool processor for controlling the accessory fluid distribution apparatus.

13. A machine tool accessory fluid distribution apparatus in accordance with claim 10, wherein the controller has a connector for connecting a user interface of the machine tool to the controller, so that, the controller is programmed to control the accessory fluid distribution apparatus from the user interface of the machine tool.

14. A machine tool accessory fluid distribution apparatus in accordance with claim 10, wherein the controller has a connector for connecting the machine tool sensors to the controller, and wherein the controller has interlocks therein which use signals from the machine tool sensors.

15. A machine tool accessory fluid distribution apparatus in accordance with claim 10, further comprising at least one sensor mounted at one of the workstations of the machine tool and connected to the controller for sending signals to the controller indicating a predetermined condition sensed by the sensor, wherein the controller has interlocks which use the signals from the sensor.

16. A machine tool accessory fluid distribution apparatus in accordance with claim 15, wherein the sensor is at least one of a thermal sensor, or a vapor sensor.

17. A machine tool accessory fluid distribution apparatus in accordance with claim 10, wherein the tubing section comprises a quick change manifold having multiple inlet ports and multiple outlet ports, each inlet port being adapted to receive a supply line connected to a port of the multi-port output, each outlet port of the quick change manifold supplying a corresponding nozzle disposed one of the workstations, and wherein each inlet port of the quick change manifold feeds a corresponding one of the outlet ports.

18. A method for delivering high pressure fluid to workstations of a machine tool comprising the steps of:
   providing an accessory fluid distribution apparatus comprising a booster pump for boosting fluid pressure higher than fluid pressure available in the machine tool, a fluid distribution system connected the booster pump, and a controller for controlling the fluid distribution apparatus;
   connecting the fluid distribution system to the machine tool for delivering high pressure fluid from the booster pump to the workstations of the machine tool; and
   connecting the controller to a processor of the machine tool, the controller being adapted for using command signals transmitted from the processor for controlling the fluid distribution apparatus to deliver high pressure fluid to at least one of the work stations independent from fluid delivered by the apparatus to another one of the work stations.

19. A method as in claim 18, further comprising the step of, with the controller, automatically redirecting fluid distribution of the apparatus without user interaction from a first one of the work stations to a second one of the work stations of the machine tool.

20. A method as in claim 18, further comprising the step of inputting commands in a user interface of the machine tool to program the controller of the fluid distribution apparatus.

21. A method as in claim 18, further comprising the step of connecting the controller to a sensor of the machine tool, wherein the controller has an interlock using signals from the sensor.

22. A machine tool fluid distribution apparatus comprising:
   a booster pump delivering, from an output end of the booster pump, a predetermined fluid output volume at a predetermined pressure;
   a fluid distribution system connected to the discharge end of the booster pump for distributing fluid from the pump to workstations of a machine tool; and
   a controller controllably connected to the fluid distribution system for controlling fluid distribution to the workstations of the machine tool;
   wherein, the controller is adapted for using machine tool command signals for controlling the distribution system for sequentially directing the fluid output volume of the pump to a first one of the workstations and then to a second one of the workstations of the machine tool.

23. A machine tool fluid distribution apparatus comprising:
   a booster pump adapted for discharging, from a discharge end of the pump, fluid at a higher pressure than a fluid pressure available in a first machine tool;
   a fluid distribution system connected to the discharge end of the booster pump for distributing fluid from the pump to machine tool workstations, the fluid distribution system having multiple outlets for distributing fluid to the machine tool workstations; and
   a controller controllably connected to the fluid distribution system for controlling the fluid distribution system;
   wherein, the controller is adapted to use machine tool command signals for operating at least one outlet of the multiple outlets independently from another outlet of the multiple outlets of the fluid distribution system.

24. A machine tool fluid distribution apparatus in accordance with claim 23, wherein the at least one outlet delivers fluid to a machine tool workstation at the first machine tool, and the other outlet delivers fluid to another machine tool workstation at a second machine tool.

25. A machine tool accessory fluid distribution apparatus comprising:
   a booster pump adapted for discharging, from a discharge end of the pump, fluid at a different pressure than a fluid pressure available in a machine tool;
   a fluid distribution system connected to the discharge end of the booster pump for distributing fluid from the pump to workstations of the machine tool; and
   a controller controllably connected to the fluid distribution system for controlling fluid distribution to the workstations of the machine tool;
   wherein, the controller controls fluid delivered by the fluid distribution system to at least one of the workstations independently from fluid delivered by the distribution system to another one of the workstations of the machine tool; and
   wherein the fluid distribution system comprises a multi-port output manifold, each output port of the multi-port manifold being controlled independently by the controller, and being connected to supply a supply line corresponding to the port, and
   a quick change manifold having multiple inlets and multiple outlets, each inlet being adapted for receiving any supply line corresponding to the output ports of the multi-port manifold.

26. A machine tool accessory fluid distribution apparatus in accordance with claim 25 wherein, each inlet of the quick change manifold communicates with only one corresponding outlet, and each outlet supplies a corresponding nozzle at one of the workstations.

* * * * *